Dec. 31, 1929.  B. WEISHAN  1,742,111
PROCESS FOR THE PRODUCTION OF SOFT IRON

Filed March 11, 1927

INVENTOR
BERNHARD WEISHAN
BY HIS ATTORNEYS
Howson and Howson

Patented Dec. 31, 1929

1,742,111

UNITED STATES PATENT OFFICE

BERNHARD WEISHAN, OF SIGMARINGEN, GERMANY

PROCESS FOR THE PRODUCTION OF SOFT IRON

Application filed March 11, 1927, Serial No. 174,551, and in Germany September 29, 1926.

This invention relates to a process for the manufacture of soft iron for the mass production of screws, nuts and the like and more particularly it refers to a method of forming the pile of puddle bars which is to be heated and rolled into stock of finished iron suitable for receiving machining operations.

A long grained or fibred welding iron has hitherto preferably been used by the pertinent industries for the production of mass articles, such as screws, nuts and the like on automatic machines and revolving lathes, which iron, in consequence of its long grained structure gave rise at each operation transverse to the grain by reason of the severance of individual fibres, to a short brittle shaving, which protected the tool and, at the same time, allowed the cooling liquid access to the cutting tools. A difficulty met with in the production of this material (known technically as screw soft-iron) lay in distributing the oxide slag as far as possible equally between the individual fibre bundles.

It is an object of this invention, therefore, to produce a long grained iron stock in which the oxide slag remaining after the final rolling operation shall be of minimum amount and shall be uniformly distributed between the individual fibre bundles.

Further, it is an object of the invention to provide a method of making up a pile of puddle-bars to be welded together by which the assembly of the bars into a pile shall be more readily and conveniently accomplished.

It is another object to provide a pile of puddle-bars in which the relation of the bars shall be such that, upon being heated in a furnace and then rolled in the usual manner, the resulting welded mass of iron shall have a minimum of slag and that minimum evenly distributed between the individual fibrous members.

It is also an object of this invention to improve upon those piles of puddle-bars in which each bar is a thin strip of iron produced by rolling, at welding heat, the so-called puddle-ball.

The method by which these objects are attained is described hereinafter and certain steps in it are illustrated in the accompanying drawing.

In the drawing—

Figure 1:
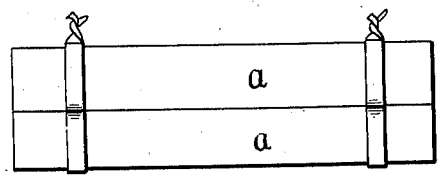
Fig. 1 is a side elevation of a pile of bars bound up in accordance with this method.
Figure 2:
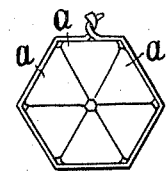
Fig. 2 is an end elevation of the pile shown in Fig. 1.

The puddle-bars $a$ are shown in Figs. 1 and 2. Their length may be as desired. The general shape of each bar is triangular as shown in Fig. 2.

Figure 5:
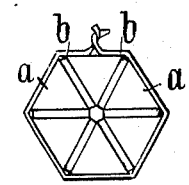
Fig. 5 is an end elevation of the pile of Fig. 4.

The edges of these bars are cut-off, flattened or rounded so that in cross-section, as seen in Fig. 5, the triangle appears with flattened apices. The manner in which these edges are eliminated is not material to the present invention as it is the final shape which effects the purpose desired. The bars themselves are produced preferably by a rolling operation performed on the puddle-ball at welding heat. The oblate edges may be formed in the same operation as that which gives the bar its general triangular shape in cross section or by a separate operation.

In forming a pile, enough of these three-sided bars are brought together to form a complete bundle, that is, such a bundle as will present in section or end view a closed polygon. Figure 2 shows a preferred form of pile in which each bar has sides of equal length. Six of these bars therefore make a complete bundle, hexagonal in shape. The merit of the six bar pile is its ease of assembly. Each edge of each bar being flattened, no attention or care is required in putting the bars together to make certain that the proper edge is at the center. And with all the bars presenting flattened edges at the center, there is necessarily formed a central passage extending longitudinally through the packet. The bundle is then bound up.

Figure 4:
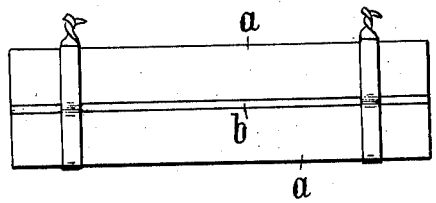
Fig. 4 is a side elevation of a pile.

Another way of insuring a central passageway is shown in Figs. 4 and 5. The bars may be the same as those used in the pile shown in Figs. 1 and 2, or they may be three sided bars without the flattened edges. In assembling, flat strips $b$ of weldable iron are inserted between bars, as shown in Figure 5, the strips having a width equal to that of the side of the bar. When assembled, there is left a passageway through the pile since the bars can not contact at the center because of the strips between them. These strips may be used with six or with any other number of bars to give a hexagonal or other polygonal shaped pile.

Having a pile assembled in either way described above, the next step is that of heating the pile in a furnace to a temperature suitable for welding. The pile is then rolled until the welding of the bars is complete. Assuming that the rolling is done in arched gauges the effect on the pile is first to weld the outer portions, then the inner ones. During the rolling and welding, the slag in the metal passes out by way of the radial joints between the three sided bars and also through the central passageway. Since the central portion of the packet remains at welding temperature longer than the outer portion, slag continues to pass out through the central passageway after the outer portions of the radial passages have been sealed by the welding of the bars together. In the welding of piles made up as in Figures 4 and 5, the slag passes out on each side of each strip $b$. Thus the flat strips provide double the number of radial passages as compared with a pile such as that of Figs. 1 and 2 of substantially the same size. Finally, in either case, the whole pile becomes welded into a solid bar of finished iron having the long grained fibrous characteristic suitable for screws, nuts and the like as pointed out above.

Figure 3:
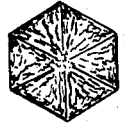
Fig. 3 is a pictorial view of a section through the same pile after the welding has been completed.
Figure 6:
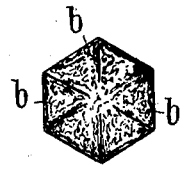
Fig. 6 is a pictorial view of a section through the Fig. 4 pile after the welding operation is completed.

Figures 3 and 6 represent pictorially the final state of the pile with the joints welded and the central passageway closed. Whatever slag remains is evenly distributed between the fibre bundles originally constituted by the puddle-bars. While there is no perceptible joint or plane of cleavage along these radial portions after the welding is completed there is a break in the shaving cut-off by a tool during turning operations on the metal. This is a desirable feature as stated above.

I claim:—

1. A process for the production of soft-iron comprising forming puddled-iron into bars substantially triangular in cross-section having flattened longitudinal edges, then binding together the bars to give a pile the sectional shape of which is that of a closed polygon having a central passageway therethrough, and rolling the pile, thereby causing slag to pass out of the central passageway.

2. In a process for the production of soft-iron the steps of forming puddled-iron into bars of triangular and equilateral cross-sections with flattened apices binding together six of these bars to form a pile having a central passageway therethrough, and rolling the pile to weld the bars together and cause slag to pass out of the passageway.

3. In the manufacture of soft-iron, the steps of forming puddled-iron into bars substantially triangular in cross-section, assembling the bars alternately with flat strips of weldable iron into a packet having a central passageway therethrough, and rolling the packet to weld the bars together and cause slag to pass out of the central passageway.

In testimony whereof I have signed my name to this specification.

BERNHARD WEISHAN.